US009952091B2

(12) United States Patent
Isozaki

(10) Patent No.: US 9,952,091 B2
(45) Date of Patent: Apr. 24, 2018

(54) MANAGEMENT SYSTEM FOR ILLUMINATION FACILITY

(71) Applicant: TOPCON Corporation, Tokyo-to (JP)

(72) Inventor: Hisashi Isozaki, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 0 days.

(21) Appl. No.: 15/207,946

(22) Filed: Jul. 12, 2016

(65) Prior Publication Data

US 2017/0023404 A1 Jan. 26, 2017

(30) Foreign Application Priority Data

Jul. 21, 2015 (JP) .................................. 2015-144011

(51) Int. Cl.
| | |
|---|---|
| *G01J 1/16* | (2006.01) |
| *G01C 21/26* | (2006.01) |
| *G01J 1/04* | (2006.01) |

(52) U.S. Cl.
CPC .............. *G01J 1/16* (2013.01); *G01C 21/265* (2013.01); *G01J 1/0403* (2013.01); *G01J 2001/1678* (2013.01)

(58) Field of Classification Search
CPC .... G01J 1/16; G01J 1/0403; G01J 2001/1678; G01C 21/265
See application file for complete search history.

(56) References Cited

U.S. PATENT DOCUMENTS

| | | | |
|---|---|---|---|
| 5,796,613 | A | 8/1998 | Kato et al. |
| 7,365,638 | B2 | 4/2008 | Eguchi |

(Continued)

FOREIGN PATENT DOCUMENTS

| | | |
|---|---|---|
| JP | 4-204006 A | 7/1992 |
| JP | 6-117923 A | 4/1994 |

(Continued)

OTHER PUBLICATIONS

Office action dated Mar. 8, 2017 in co-pending U.S. Appl. No. 15/207,917.

(Continued)

*Primary Examiner* — Sang Nguyen
(74) *Attorney, Agent, or Firm* — Nields, Lemack & Frame, LLC

(57) ABSTRACT

The invention provides a management system for an illumination facility, which comprises an illuminance measuring instrument, a position detector for detecting a position of the traveling vehicle, and an arithmetic device, which are mounted on a traveling vehicle, wherein the arithmetic device is configured to save a map information, positional data of an illumination lamp, initial data including illuminance data, and the illuminance data as acquired by the illuminance measuring instrument while driving the traveling vehicle, and wherein the arithmetic device is configured to calculate daily management data of the illumination facility based on the positional data of the traveling vehicle as detected by the position detector, the map information, and the illuminance data, and further wherein the arithmetic device is configured to calculate a change of the illumination facility including the illumination lamp based on the initial data and the daily management data.

10 Claims, 4 Drawing Sheets

(56) References Cited

U.S. PATENT DOCUMENTS

| | | | |
|---|---|---|---|
| 2009/0085728 A1* | 4/2009 | Catten | H04K 3/415 340/425.5 |
| 2009/0252380 A1* | 10/2009 | Shimizu | G08G 1/163 382/107 |
| 2009/0312987 A1 | 12/2009 | Uedaira et al. | |
| 2010/0030419 A1* | 2/2010 | Tauchi | B60Q 1/1423 701/31.4 |
| 2012/0127016 A1* | 5/2012 | Watanabe | G01S 7/412 342/70 |
| 2014/0126780 A1* | 5/2014 | Wang | G06T 7/20 382/107 |
| 2014/0320946 A1* | 10/2014 | Tomkins | G02F 1/163 359/275 |
| 2014/0358841 A1* | 12/2014 | Ono | G08G 1/0112 706/52 |
| 2017/0023351 A1 | 1/2017 | Isozaki et al. | |
| 2017/0023403 A1 | 1/2017 | Isozaki et al. | |

FOREIGN PATENT DOCUMENTS

| | | | |
|---|---|---|---|
| JP | 7-280645 A | 10/1995 | |
| JP | 10-9951 A | 1/1998 | |
| JP | 10-288549 A | 10/1998 | |
| JP | 2005-140644 A | 6/2005 | |

OTHER PUBLICATIONS

Notice of allowance dated Apr. 25, 2017 in co-pending U.S. Appl. No. 15/207,917.

* cited by examiner

MANAGEMENT SYSTEM FOR ILLUMINATION FACILITY

BACKGROUND OF THE INVENTION

The present invention relates to a management system, for an illumination facility provided on a general road, an expressway, in a tunnel or the like.

In illumination facilities installed on a road or in a tunnel or the like, it is necessary to meet standards or criteria which determine an illuminance, and an illuminance measurement and an illuminance distribution measurement of the illumination facilities are performed.

Further, since a decrease in illuminance of an illumination lamp, or a blowout of the lamp, or the like occurs over an elapse of time, the illuminance measurement is performed as a daily management. In a case where the decrease in illuminance of the illumination lamp or the blowout of the lamp is detected, a maintenance such as a replacement of the lamp or the like is performed.

Japanese Patent Application Publication No. Hei 10-288549 discloses one which detects a decrease in an illuminance of an illumination lamp and a blowout of the lamp.

Japanese Patent Application Publication No. Hei 10-288549 discloses a brightness/darkness discriminating and measuring apparatus, and the brightness/darkness discriminating and measuring apparatus measures the brightness/darkness of an illumination lamp in a tunnel and specifies a position of the illumination lamp. For this reason, the brightness/darkness discriminating and measuring apparatus comprises a special photosensor for detecting the illumination lamp, a reflector provided at an already determined position on a wall surface of the tunnel, a position detecting light sensor for detecting the reflector, and an axle sensor for measuring a running distance of a measuring vehicle.

In Japanese Patent Application Publication No. Hei 10-288549, a configuration is complicated, and reflectors installed on the wall surface are required for the purpose of specifying an illuminance measurement result and positions of the illumination lamp. For this reason, there is a problem in which the reflector for specifying the position of the illumination lamp is required in order to identify illuminance measuring positions and a measuring illumination state is limited to the illumination lamps installed in the tunnel.

SUMMARY OF THE INVENTION

It is an object of the present invention to provide a management system for an illumination facility which can measure an illuminance state of an individual illumination lamp and can manage the illumination facility with a simple configuration in any illumination lamp installing environment, e.g., an illumination lamp installed in an open space other than a tunnel or an illumination lamp installed in the tunnel, or the like.

To attain the object as described above, a management system for an illumination facility according to the present invention comprises an illuminance measuring instrument, a position detector for detecting a position of the traveling vehicle, and an arithmetic device, which are mounted on a traveling vehicle, wherein the arithmetic device is configured to save a map information, positional data of an illumination lamp, initial data including illuminance data, and the illuminance data as acquired by the illuminance measuring instrument while driving the traveling vehicle, and wherein the arithmetic device is configured to calculate daily management data of the illumination facility based on the positional data of the traveling vehicle as detected by the position detector, the map information, and the illuminance data, and further wherein the arithmetic device is configured to calculate a change of the illumination facility including the illumination lamp based on the initial data and the daily management data.

Further, in the management system for the illumination facility according to the present invention, the arithmetic device has a correction coefficient due to a distance from the ground to an illuminance measuring instrument mounting position and a correction coefficient due to a speed of the traveling vehicle, and corrects the illuminance data into corrected illuminance data corresponding to the initial data based on both the correction coefficients.

Further, in the management system for the illumination facility according to the present invention, the arithmetic device calculates a plurality of different management data based on the initial data and the daily management data and has a selecting function for selecting the plurality of different management data, and wherein the arithmetic device further comprises a display unit and an operation unit and the management data corresponding to a selected function is displayed on the display unit by selecting one of the functions by the operation unit.

Further, in the management system, for the illumination facility according to the present invention, the management data as displayed is a display as superimposed a measurement area on the map information.

Further, in the management system, for the illumination facility according to the present invention, as to the management data as displayed, the measurement area is superimposed on the map information, a cursor indicating a measuring position is displayed, and the illuminance information of a position of the cursor is displayed.

Further, in the management system for the illumination facility according to the present invention, the management data as displayed is an enlarged display of a measurement area.

Further, in the management system for the illumination facility according to the present invention, the management data as displayed is a three-dimensional display of measurement data.

Further, in the management system for the illumination facility according to the present invention, the management data as displayed is the three-dimensional display showing a difference between the initial data and the daily management data.

Further, in the management system for the illumination facility according to the present invention, the management data as displayed is the display of a change over time of an illuminance of a specified illumination lamp.

Furthermore, in the management system for the illumination facility according to the present invention, standard data of the illumination lamp is further stored in the arithmetic device, the arithmetic device calculates the change over time of the illumination lamp based on the daily management data and diagnoses a soundness of the illumination lamp based on the change over time of the illumination lamp and the standard data.

According to the present invention, the management system for the illumination facility comprises an illuminance measuring instrument, a position detector for detecting a position of the traveling vehicle, and an arithmetic device, which are mounted on a traveling vehicle, wherein the arithmetic device is configured to save a map information, positional data of an illumination lamp, initial data including illuminance data, and the illuminance data as acquired by the illuminance measuring instrument while driving the traveling vehicle, and wherein the arithmetic device is configured to calculate daily management data of the illumination facility based on the positional data of the traveling vehicle as detected by the position detector, the map information, and the illuminance data, and further wherein the arithmetic device is configured to calculate a change of the illumination facility including the illumination lamp based on the initial data and the daily management data. As a result, the daily management data can be acquired from the normal running of the running vehicle, an acquisition of the daily management data is easy, and a management of the illumination facility can be easily performed by a judgment over time on the daily management data.

Further, according to the present invention, in the management system for the illumination facility, the arithmetic device has a correction coefficient due to a distance from the ground to an illuminance measuring instrument mounting position and a correction coefficient clue to a speed of the traveling vehicle, and corrects the illuminance data into corrected illuminance data corresponding to the initial data based on both the correction coefficients. As a result, a correspondence between the daily management data acquired from the normal running of the running vehicle and the initial data is performed with high accuracy, and an accuracy and a reliability of the daily management can be improved.

Further, according to the present invention, in the management system for the illumination facility, the arithmetic device calculates a plurality of different management data based on the initial data and the daily management data and has a selecting function for selecting the plurality of different management data, and wherein the arithmetic device further comprises a display unit and an operation unit and the management data corresponding to a selected function is displayed on the display unit by selecting one of the functions by the operation unit. As a result, the management data can be used from different viewpoints, and a convenience can be improved.

Further, according to the present invention, in the management system for the illumination facility, the management data as displayed is a display as superimposed a measurement area on the map information. As a result, a geographical grasp of the illumination facility to be objected becomes easy.

Further, according to the present invention, in the management system for the illumination facility, as to the management data as displayed, the measurement area is superimposed on the map information, a cursor indicating a measuring position is displayed, and the illuminance information of a position of the cursor is displayed. As a result, an illumination information of a desired position can be easily obtained, and the convenience can be improved.

Further, according to the present invention, in the management system for the illumination facility, the management data as displayed is an enlarged display of a measurement area. As a result, a grasp of the illumination lamp to be objected becomes easy.

Further, according to the present invention, in the management system for the illumination facility, the management data as displayed is a three-dimensional display of measurement data. As a result, a management condition can be visually judged.

Further, according to the present invention, in the management system for the illumination facility, the management data as displayed is the three-dimensional display showing a difference between the initial data and the daily management data. As a result, the change from, an initial state of the illumination facility can be visually judged.

Further, according to the present invention, in the management system for the illumination facility, the management data as displayed is the display of a change over time of an illuminance of a specified illumination lamp. As a result, a deteriorated state of individual illumination lamps can be promptly judged.

Furthermore, according to the present invention, in the management system for the illumination facility, standard data of the illumination lamp is further stored in the arithmetic device, the arithmetic device calculates the change over time of the illumination lamp based on the daily management data and diagnoses a soundness of the illumination lamp based on the change over time of the illumination lamp and the standard data. As a result, an objective judgment can be made, and a certainty of a maintenance can be improved.

BRIEF DESCRIPTION OF THE DRAWINGS

FIG. 5A shows a display of a map information and a measurement area, FIG. 5B shows the display of measuring position data, FIG. 5C shows an enlarged display of the measurement area, FIG. 5D shows a three-dimensional display of the measurement data, FIG. 5E shows the three-dimensional display of comparison data, and FIG. 5F shows the display of individual data of the illumination lamp.

DETAILED DESCRIPTION OF THE PREFERRED EMBODIMENT

A description will be given below on an embodiment of the present invention by referring to the attached drawings.

First, a description will be given on a spatial light measuring system used in an embodiment according to the present invention by referring to FIG. 1 and FIG. 2. Further, one example of an embodiment, as described below is a case which is applied to an illumination facility as provided on a general road, an expressway, in a tunnel and the like, and the illumination facility includes illumination lamps as provided along a road at a predetermined interval.

Figure 1:
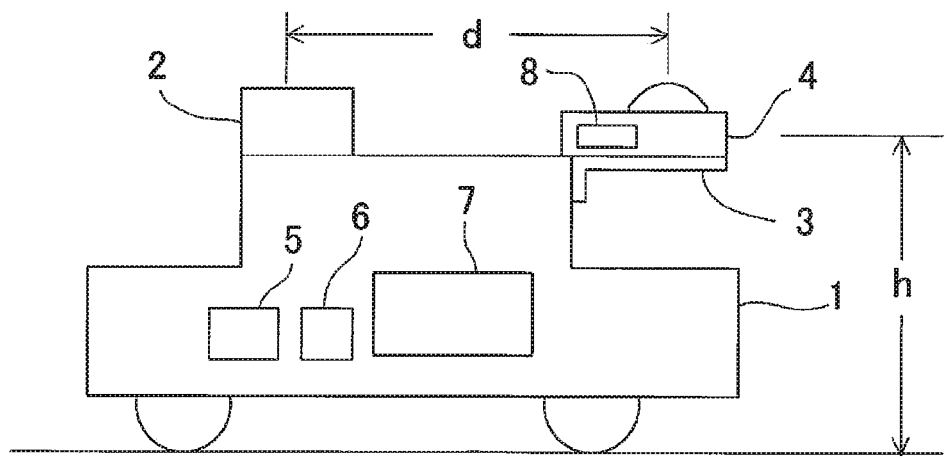
FIG. 1 is a schematical drawing of one example of a spatial light measuring system used in an embodiment of the present invention.
Figure 2:
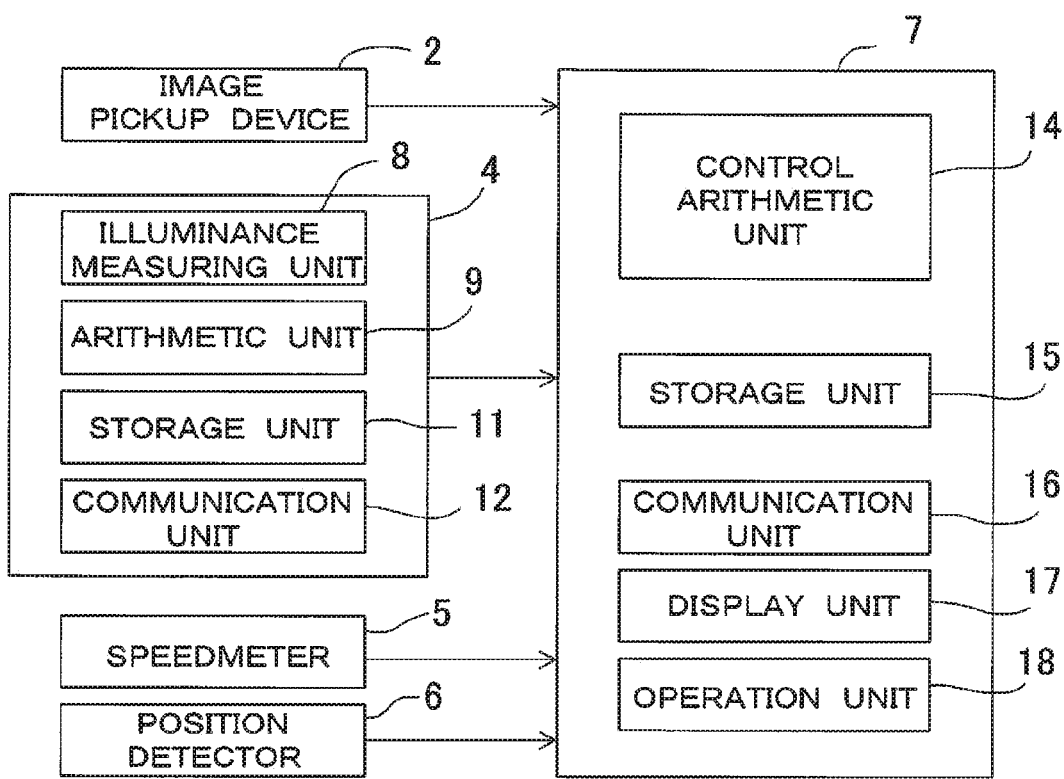
FIG. 2 is a schematical block diagram, of the spatial light, measuring system.

In FIG. 1, reference numeral 1 denotes a traveling vehicle such as a car, and an image pickup device 2 is provided on an upper surface of the traveling vehicle 1. Further, an illuminance measuring instrument 4 is provided on the upper surface of the traveling vehicle 1 via a support base 3. In the traveling vehicle 1, a speedmeter 5 for detecting a running speed and a position detector 6 (e.g., a GNSS (Global Navigation Satellite System) or an IMU (Inertial Measurement Unit)) for measuring a moving distance are provided, and an arithmetic device (a PC) 7 is further equipped. It is to be noted that the arithmetic device 7 may be a portable note PC, a tablet terminal, a smartphone, or the like.

The image pickup device 2 has at least one camera, and the camera is directed toward a direction which enables to photograph a necessary area including an illumination lamp installed along a road. The camera can acquire still images at predetermined time intervals, or is a video camera. Further, the image pickup device 2 may have a plurality of cameras and be configured to acquire images around the illumination lamp in a wide range.

Further, an image acquired by the image pickup device 2 is stored in the arithmetic device 7.

The illuminance measuring instrument 4 is provided at a known height h above the ground, and horizontally supported by the support base 3. A distance d between a reference position of the illuminance measuring instrument 4 (e.g., a center of a light receiving unit) and a reference position of the image pickup device 2 (e.g., the center of an image pickup element) is known. It is to be rioted that, even in a case where, e.g., the traveling vehicle 1 travels on an inclined surface, since an illuminance on a horizontal plane is obtained, the support base 3 may be so arranged to support the illuminance measuring instrument 4 via a gimbal mechanism and to horizontally hold the illuminance measuring instrument 4.

Further, the illuminance measuring instrument 4 may be mechanically attachable to and detachable from the support base 3 and electrically attachable to and detachable from the arithmetic device 7, and the illuminance measuring instrument 4 may be removable.

An electrical connection between the illuminance measuring instrument 4 and the arithmetic device 7 may be either a wireless manner or a wired manner. In a case where the illuminance measuring instrument 4 is connected to the arithmetic device 7 with a wireless communication, each of the illuminance measuring instrument 4 and the arithmetic device 7 has a communication unit capable of performing a data communication.

A description will be given on general features of arrangement of the spacial light measuring system by referring to FIG. 2.

The illuminance measuring instrument 4 has an illuminance measuring unit 8, an arithmetic unit 9, a storage unit 11, a communication unit 12, and others. The arithmetic unit 9 has a built-in clock, and the illuminance measuring instrument 4 may perform an illuminance measurement in association with a time. An illuminance measurement result as obtained by the illuminance measuring unit 8 is transmitted to the arithmetic device 7 via the communication unit 12, and saved in the arithmetic device 7 in the time series.

In the storage unit 11, a program required for the illuminance measurement, a communication program for performing the data communication, or the like are stored, and further the illuminance measurement result is saved.

The arithmetic device 7 mainly has a control arithmetic unit 14, a storage unit 15, a communication unit 16, a display unit 17 and an operation unit 18. It is to be noted that the display unit 17 may be a touch panel, and the display unit 17 may also be used as the operation unit 18.

The storage unit 15 stores programs like an initial value measuring program for obtaining an initial value in the illuminance measurement, a daily management measuring program for periodically or appropriately carrying out, a data correcting program for associating initial data acquired in the initial value measurement with illuminance data acquired in the daily management measurement, a management program including a program for displaying a change of an illumination state of the illumination facility based on the illuminance data acquired in the daily management measurement, and the like. Further, the storage unit 15 saves map data including at least an illuminance measurement area, and the initial data, the illuminance data acquired in the daily management measurement, and further, data such as a change of an illuminance and the like in time series.

Further, image data (i.e., still image data or frame image data) from, the image pickup device 2 is input to the arithmetic device 7, and the image data is saved in the storage unit 15 in time series. A running speed of the traveling vehicle 1 is detected by the speedmeter 5, and a speed signal as detected is input to the arithmetic device 7.

The arithmetic device 7 has a clock function, and can associate a signal acquisition time with various kinds of signals such as an illuminance measurement time, an image data acquisition time, a speed measurement time, and the like based on a time signal from, the GNSS device or an internal clock signal.

The speedmeter 5 may be a speedmeter provided in the traveling vehicle 1. A speed signal output from, the speedmeter may be input, to the arithmetic device 7. Further, it may be so arranged that a moving distance of the traveling vehicle 1 is measured based on a running distance obtained by the speedmeter. Further, in a case where an IMU is used as the position detector 6, a running speed may be detected by the position detector.

When programs such as a program with respect to the spatial light measuring system like the initial value measuring program and the daily management measuring program is stored in the storage unit 11 of the illuminance measuring instrument 4, the arithmetic unit 9 is allowed to perform a spatial light measurement and the measurement data, the image data, or the like is saved in the storage unit 11, the arithmetic device 7 may be omitted.

The position detector 6 may measure a position based on a signal from the GNSS device, measure a moving distance from an already-known position by the IMU and measure a current position based on the moving distance, or measure a moving distance from the already-known position based on a measurement starting time and the speed signal from the speedmeter 5.

It is to be noted that, in the present embodiment, the position detector 6 may have enough measurement accuracy to distinguish the illumination lamp from other illumination lamps, and there may be an error of approximately several tens of centimeters, for instance.

Next, a description will be given on an operation of a management system for the illumination facility of the present embodiment.

Further, the following description corresponds to a case where an illuminance measurement of an illumination facility installed along a road is performed.

In the illumination facility (not shown), an illumination lamp (not shown) is generally provided at a forward end of each of supporting poles erected at the predetermined intervals. The image pickup device 2 has a field angle which includes the illumination lamp in an image, or a direction of an optical axis of the image pickup device 2 is set so that the illumination lamp is included in an image. Further, it is preferable to include a background around the illumination lamp in the image so that the illumination lamp can be easily specified.

In the management system of the illumination facility according to the present embodiment, an illuminance state at a beginning of an installation of the illumination facility is determined as the initial data, or an illuminance at a time of replacing a lamp is determined as the initial data, and a management is performed based on a change of an illuminance with respect to the initial data (a change over time).

The initial data includes the position of the illumination lamp, an illuminance measuring position, and a measured illuminance, and if they are acquired in advance, the initial data is used. It is to be noted that the initial data can be also acquired by the present management system.

Figure 3A:
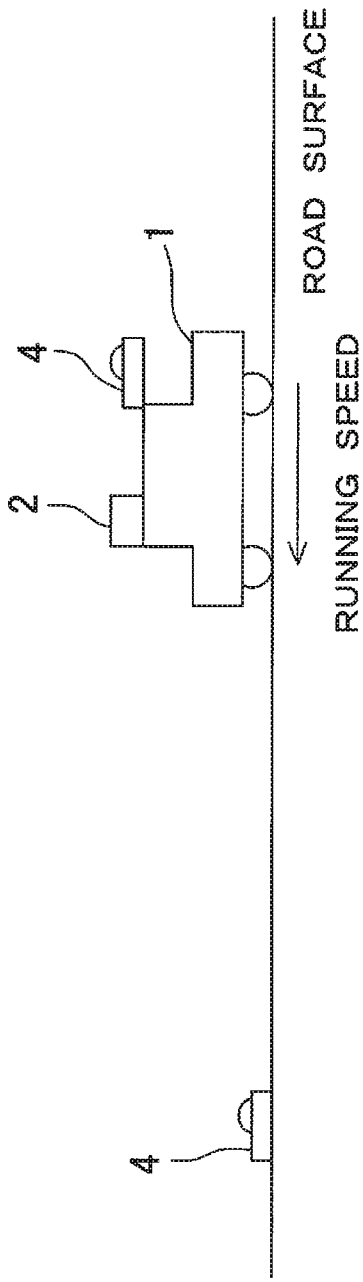
FIG. 3A is an explanatory drawing to show an acquisition of initial data performed, by the spatial light measuring system.

First, a description will be given on an acquisition of the initial data by the present management system by referring to FIG. 3A.

As described above, as a time of acquiring the initial data, the acquisition is performed in a state where the illumination facility is new and sound, e.g., a time when the illumination facility is newly installed or a time when the lamp is replaced, or the like.

According to illuminance measurement standards of JIS (Japanese Industrial Standards), the measurement is performed at a position which is 15 cm or less from a surface to be measured. Therefore, in an initial value measurement for acquiring initial data, the illuminance measuring instrument 4 is put on a road surface, and the measurement is performed. The illuminance measuring instrument 4 may be a removed illuminance measuring instrument which was mounted on the traveling vehicle 1 or an additionally provided illuminance measuring instrument may be used.

The illuminance measuring instrument 4 is moved at the predetermined intervals and the illuminance measurement is performed every time the illuminance measuring instrument 4 is put on. A putting position (an illuminance measuring position) of the illuminance measuring instrument 4 is known by, e.g., previously setting, or the like. Preferably, it is desirable for the putting position of the illuminance measuring instrument 4 to correspond to the position of the illumination lamp. It is to be noted that the position of the illumination lamp is already-known from, installation and working data and the like.

An illuminance measurement value is associated with an illuminance measuring position and recorded, as a measurement result. When the illuminance measurement is performed, an illuminance at each measuring position is obtained, and an illuminance distribution along the road is obtained.

Here, the illuminance measuring instrument 4 may be moved by an operator, or may be mounted on a radio control car or the like and moved by remote control. An illuminance, which is measured according to the standard when the illuminance measuring instrument 4 is put on a road surface, is determined, as a reference illuminance.

When the illuminance measurement is completed in a measurement area by the illuminance measuring instrument 4 with respect to the road surface, the illuminance measuring instrument 4 is mounted on the traveling vehicle 1, and the illuminance measurement is carried out in a state where the traveling vehicle 1 is running. An illuminance obtained by performing the measurement in the running state is determined as a measured illuminance.

With respect to a position of the traveling vehicle 1, a running start position is associated with a known position in the measurement area (e.g., a first illuminance measuring position), or a relation between the measurement area and the first illuminance measuring position is made already-known. When a distance from the running start position is measured by the position detector 6 or measured by the speedmeter of the traveling vehicle 1, a position of the traveling vehicle 1 can be measured with respect to the measurement area.

Alternatively, the position of the traveling vehicle 1 may be directly measured by the GNSS device.

During the running, the images are continuously acquired by the image pickup device 2. A running speed of the traveling vehicle 1 is measured by the speedmeter 5, it is possible to specify which part of the measurement area is picked up by the still image or the frame image based on a running speed and a time interval such as an acquisition interval of the still image or a time interval between the frame images.

Alternatively, if a pickup timing is associated with positional data acquired by the position detector 6, it is possible to know at which position the image is acquired.

Further, the illuminance measuring position during the running can be determined based on an elapsed time from the measurement start time and the running distance of the traveling vehicle 1. Based on a determined illuminance measuring position during the running and a reference illuminance measuring position, it is possible to associate an illuminance measurement result during the running with the reference illuminance, the still images and the frame images.

Further, with respect to the illuminance measuring position during the running, it is possible to associate the measured illuminance data with the illuminance measuring position by acquiring a positional information at the time of measuring the illuminance from, the position detector 6.

Further, since the installation position of the illumination lamp is already-known, the position of the illumination lamp can be superimposed on the map data. Thus, it is possible to prepare an initial value map (MAP) showing a positional relation between the measuring position and the illumination lamp and between the illuminance and the illumination lamp and a relation between an illuminance distribution and illumination lamps.

Next, distances h from the road surface differ in a case where the illuminance measuring instrument 4 is put on the road surface and in a case where the illuminance measuring instrument 4 is mounted on the traveling vehicle 1 (see FIG. 1). For this reason, a light receiving amount differs due to a difference in height, and a difference in measured illuminance occurs.

Further, in a case where the illuminance measuring instrument 4 measures the illuminance in a stationary state and in a case where the illuminance measuring instrument 4 is mounted on the traveling vehicle 1 and performs a measurement while running, since spans of light receiving times differ at different, times, light receiving amounts differ and differences in measured illuminance occur.

Therefore, the illuminance measured during the running (the measured illuminance) is associated with the reference illuminance.

It is assumed that the reference illuminance is A and the measured illuminance measured during the running is B. It is assumed that a correction coefficient due to a difference in position is $\alpha$ and a correction coefficient due to a speed is $\beta$. It is to be noted that the correction coefficients $\alpha$ and $\beta$ are obtained by an actual measurement or a calculation.

Therefore, a relationship between the reference illuminance A and the measured illuminance B is expressed by the following equation:

$$B = \alpha \times \beta \times A \qquad (1)$$

According to the above-mentioned steps, the initial data can be acquired.

Figure 3B:
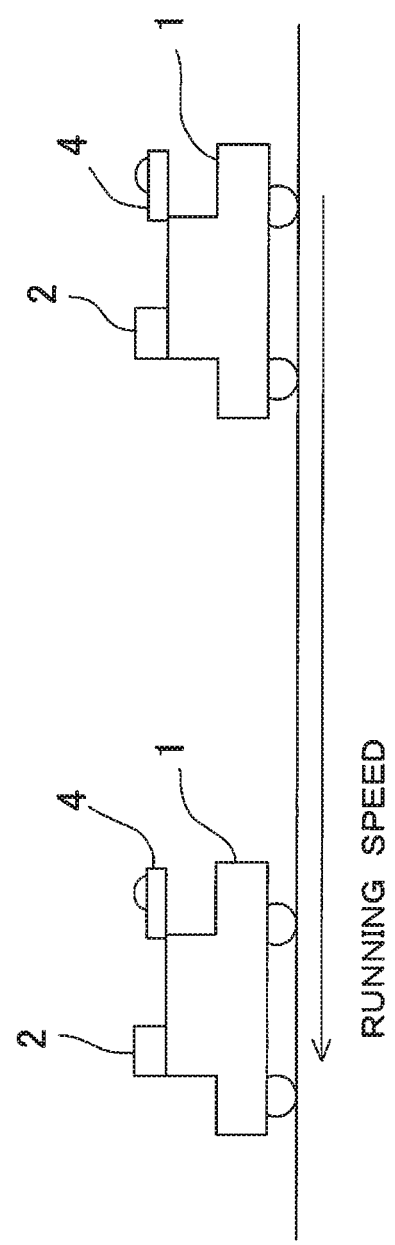
FIG. 3B is an explanatory drawing to show an acquisition of daily management data performed by the spatial light measuring system.

Next, a description will be given on the acquisition of daily management data by referring to FIG. 3B.

A daily management measurement is performed, e.g., every predetermined time interval, or when a blowout of a lamp or a decrease in illuminance is found, or the like.

Similar to the acquisition of the initial data, the illuminance measuring instrument 4 is mounted on the traveling vehicle 1, the traveling vehicle 1 is made to run in a measurement area, and the illuminance data is acquired. Further, an illuminance distribution is prepared based on the illuminance data as acquired, and an initial value map (MAP) showing a relation between the measuring position and the illuminance data, between the illumination lamp and the illuminance data, and between the illuminance distribution and the illumination lamp is prepared.

Assuming that the daily management data is B', according to the above-mentioned equation (1), the daily management data B' is able to be converted into the illuminance data A' on the road surface. Further, assuming that an illuminace difference from the initial data B0 is C=(B0−B'), the following equation can be obtained:

$$C=(B0-B') \quad C=\alpha \times \beta \times (A-A') \qquad (2)$$

In a case where a change of an illuminance (A-A') is higher than a predetermined value, it can be assumed that the illumination of a spot where the illuminance changes has a trouble. The illuminance difference C (or the change of an illuminance (A-A')) is sequentially saved in the arithmetic device 7 each time the illuminance is measured. Therefore, a change of a latest measured illuminance from a previous measured illuminance can be also measured.

In the present embodiment, it is possible to acquire the data such as the map information, the positional information of the illumination lamp, the initial data, the daily management data, measuring position data, the image data, and the like. In the present embodiment, based on such information, a management information can be turned to an image and displayed.

Further, by comparing the illuminance distribution of the initial data with the illuminance distribution of the daily management data, it is possible to confirm a decrease in overall illuminance and a decrease in partial illuminance, and these decreases can be used as an information for judging a deteriorated state of the illumination lamp. Thus, by comparing the initial data with the daily management data, it is possible to judge a soundness of the illumination facility including the blowout and a deterioration of the illumination lamp.

In a case where the blowout of the lamp has occurred, by comparing the initial data with the daily management data, it is possible to specify a position of the blowout of the lamp and, further in the present embodiment, since an image is acquired simultaneously with the acquisition of the illuminance data and the image is associated with the position of the lamp, the position of the blowout of the lamp can be specified by the image.

Further, since the daily management measurement is performed in a state where the general vehicles pass, there is an influence of a light of an oncoming vehicle or the like, but by confirming an image, it is possible to judge whether the illumination lamp has caused the deterioration or the light of an oncoming vehicle affects or the like, and judging a validity or invalidity of doubtful data become easy. Thus, by the fact that the image judgment is also adopted, the blowout of the lamp and the deterioration of the lamp can be more easily and assuredly judged, and hence an operator can efficiently perform a replacement operation.

When the image pickup device 2 has a plurality of cameras or an omnidirectional camera, the image pickup device 2 can acquire the images of not only the illumination lamp part but also a surrounding scene, and the recognizing the illumination lamp and the specifying the position of the illumination lamp by the operator can become further easy.

Figure 4:
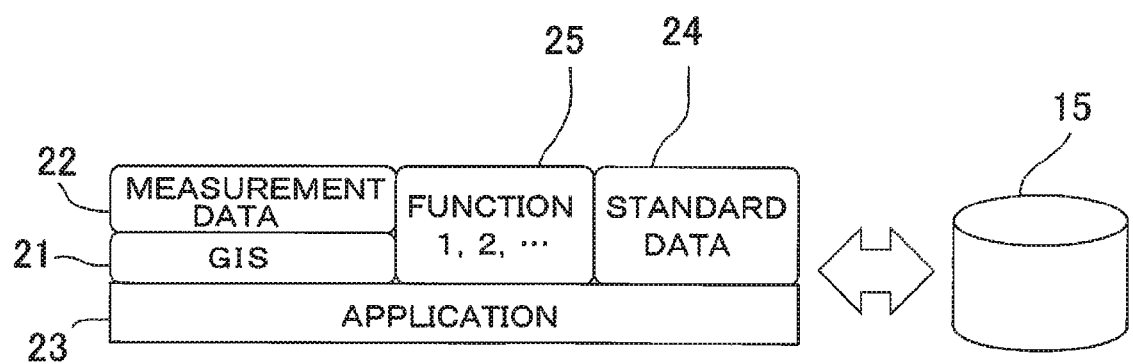
FIG. 4 is a schematical drawing to show a relation between map data, measurement data, an application, standard data of an illumination lamp and a function executed by the application.

FIG. 4 is a schematical drawing to show a relation between map data (GIS) 21, measurement data 22 such as the positional data and the like, an application (the management program) 23, standard data 24 of the illumination lamp (e.g., an initial illuminance, a relation between the illuminance and an illuminance time and a service life), and functions 25 as executed by the application 23. When a function as executed by the application 23 is selected, data as desired can be selected from a plurality of management data and displayed.

Figure 5A:
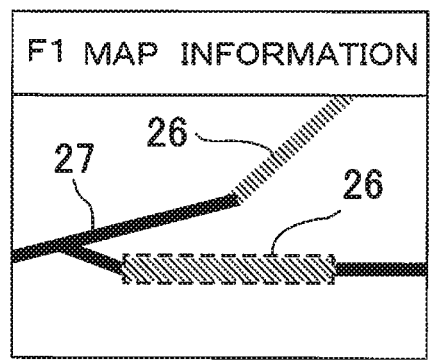
FIG. 5A to FIG. 5F are drawings to show contents displayed by selecting the function executed by the application (the contents of the management data).

For instance, when a function (hereinafter, "F" for short) 1 is selected from, the operation unit 18, the map information and the measurement area are displayed on the display unit 17 (see FIG. 5A). For instance, an area where the illuminance measurement is performed and data exists (the measurement area) is displayed by color coding on the map, or is displayed by enclosing the measurement area in a broken line or the like.

By a display of F1, a measurement area 26 and an unmeasured area 27 become clear, a duplication of the measurement and an unmeasurement can be prevented, and a measuring operation plan can be planned easily.

Figure 5B:
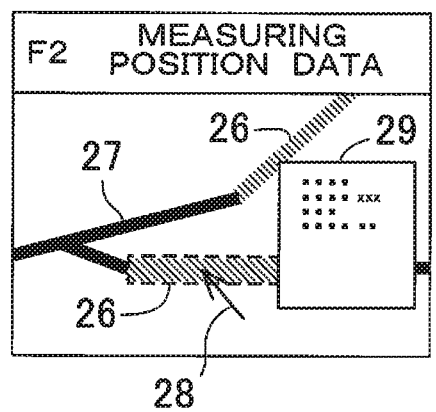

Next, when F2 is selected, the measuring position data can be confirmed (see FIG. 5B). When F2 is selected, a cursor 28 is displayed. When the cursor 28 is moved to an arbitrary position in the measurement area 26, an illuminance information 29 of a position indicated, by the cursor 28 can be acquired. As the illuminance information, there are the positional information, the illuminance data, a measurement date and time, and the like of the position indicated by the cursor 28.

Figure 5C:
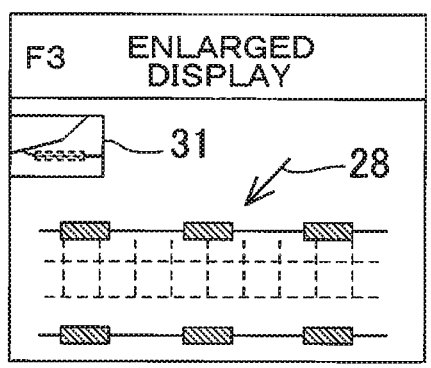

Further, when F3 is selected, the measurement area 26 of the position indicated by the cursor 28 is enlarged and displayed (see FIG. 5C). In a screen of an enlarged display, a position of an object (the illumination lamp) and a mesh for showing a measuring position are displayed. When the cursor 28 is moved to the object to be measured, the positional information of the object to be measured, for instance, a unique number of the object to be measured and the illuminance data of the object to be measured are displayed. Further, when an intersection of the mesh is pointed by the cursor 28, the positional information and the illuminance data at a measuring point are shown. It is to be noted that, to clarify a relation between an enlarged portion and the measurement area 26, an F1 screen 31 may be displayed in a subwindow.

Figure 5D:
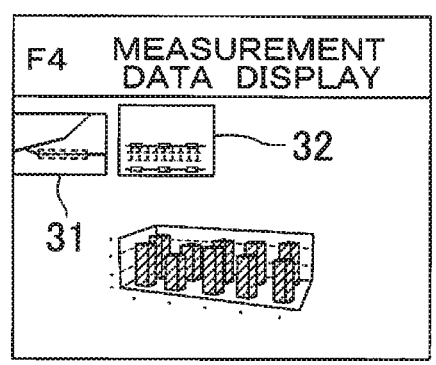

Next, when F4 is selected, the measurement data is displayed (see FIG. 5D). As a method for displaying the measurement data, various kinds of methods can be considered and a three-dimensional display by a column graph is performed, for instance.

The illuminance of each measuring point is shown by the column graph which rises from each measuring point. Further, as to the measurement data as displayed, by selecting the initial data, the initial data is displayed three-dimensionally, and by selecting the daily management data and inputting a date, the daily management data measured on the date is displayed three-dimensionally. Further, to clarify the position of the measurement area and the measuring position, the F1 screen 31 and an F3 screen 32 may be displayed in the subwindows.

Figure 5E:
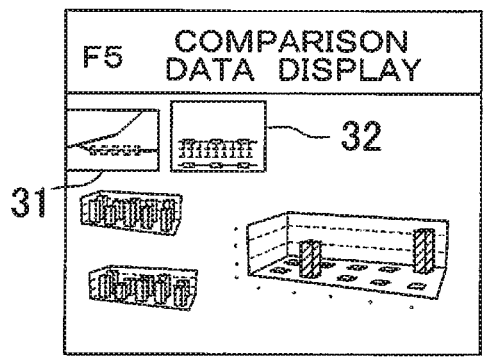

Further, when F5 is selected, a comparison data of the initial data of the measurement area and a latest daily management data, of the measurement data, is displayed three-dimensionally (see FIG. 5E). It is to be noted that, the initial data and the latest daily management may be displayed at the same time so as to identify the object to be compared. In this case likewise, to clarify a position of the measurement area and a measuring position, the F1 screen 31 and the F3 screen 32 may be displayed in the subwindows.

A change of an illuminance of individual illumination lamps is recognized by the three-dimensional display of the comparison data. In FIG. 5E, there are some protruding columns in the column graph. At the positions where the columns protrude, the change of an illuminance of the illumination lamps are considerable and it can be understood that the blowouts of the lamps are occurred or the illuminance is considerably decreased.

It is to be noted that data to be compared are not limited to the initial data and the latest daily management data. For instance, the daily management data may be compared with each other.

Figure 5F:
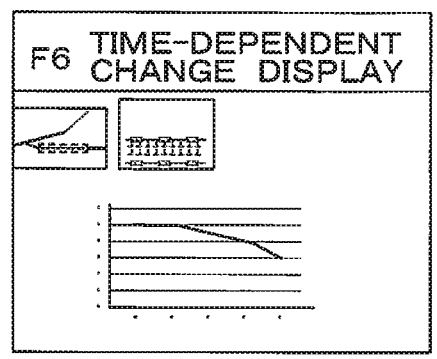

When F6 is selected, the comparison data of an individual illumination lamp, of the measurement data, is displayed over time. For instance, when the position of the object to be measured is specified by the cursor 28, a change over time of an illuminance of the object to be measured is displayed by a line graph having an axis of abscissa representing a time and an axis of ordinate representing an illuminance (see FIG. 5F).

Further, when the object to be measured is specified by the cursor 28 and F7 (not shown) is selected, a diagnosis of the soundness is carried out. In the diagnosis of the soundness, for instance, the change over time of a specified object (the illumination lamp), the standard data 24 and the like are taken into consideration, and a time to replace the specified object is indicated. Alternatively, in a case where there is a possibility of the blowout of the lamp or in a case where the blowout of the lamp is occurred, an alarm, for informing that, an emergency operation is required or the like, is displayed.

Further, in the present embodiment, by accumulating the daily management data, when a date and time is designated, it is possible to easily grasp the illumination state of the illumination facility at an arbitrary date and time in the past.

Thus, the illuminance data of the illumination facility and further the illumination lamp can be acquired by traveling like the general vehicles, a current illumination state can be grasped. Further, it is possible to improve a quality of the management about the illumination facility, e.g., enable to perform a maintenance operation at an appropriate timing according to a detection, a specifying of the illumination lamp which needs to be replaced and the diagnosis of the soundness.

The invention claimed is:

1. A management system for an illumination facility comprising: an illuminance measuring instrument for measuring an illuminance of said illumination facility provided on a general road, an express way or in a tunnel, wherein the illuminance measuring instrument comprises an illuminance measuring unit, a position detector for detecting a position of said traveling vehicle, and an arithmetic device, which are mounted on a traveling vehicle, wherein said arithmetic device is configured to save a map information, positional data of an illumination lamp which is included in said illumination facility, initial data including illuminance data of said illumination facility, and said illuminance data as acquired by said illuminance measuring instrument while driving said traveling vehicle, and wherein said arithmetic device is configured to calculate daily management data of said illumination facility based on said positional data of said traveling vehicle as detected by said position detector, said map information, and said illuminance data, and further wherein said arithmetic device is configured to calculate a change of said illumination facility including said illumination lamp based on said initial data and said daily management data.

2. The management system for the illumination facility according to claim 1, wherein said arithmetic device has a correction coefficient due to a distance from the ground to an illuminance measuring instrument mounting position and a correction coefficient due to a speed of said traveling vehicle, and corrects said illuminance data into corrected illuminance data corresponding to said initial data based on both the correction coefficients.

3. The management system for the illumination facility according to claim 1, wherein said arithmetic device calculates a plurality of different management data based on said initial data and said daily management data and has a selecting function for selecting said plurality of different management data, and wherein said arithmetic device further comprises a display unit and an operation unit and said management data corresponding to a selected function is displayed on said display unit by selecting one of said functions by said operation unit.

4. The management system for the illumination facility according to claim 3, wherein said management data as displayed is a display as superimposed a measurement area on said map information.

5. The management system for the illumination facility according to claim 3, wherein, as to said management data as displayed, said measurement area is superimposed on said map information, a cursor indicating a measuring position is displayed, and the illuminance information of a position of said cursor is displayed.

6. The management system for the illumination facility according to claim 3, wherein said management data as displayed is an enlarged display of a measurement area.

7. The management system for the illumination facility according to claim 3, wherein said management data as displayed is a three-dimensional display of measurement data.

8. The management system for the illumination facility according to claim 3, wherein said management data as displayed is the three-dimensional display showing a difference between said initial data and said daily management data.

9. The management system for the illumination facility according to claim 3, wherein said management data as displayed is the display of a change over time of an illuminance of a specified illumination lamp.

10. The management system for the illumination facility according to claim 1, wherein standard data of said illumination lamp is further stored in said arithmetic device, said arithmetic device calculates the change over time of said illumination lamp based on said daily management data and diagnoses a soundness of said illumination lamp based on the change over time of said illumination lamp and said standard data.

* * * * *